United States Patent [19]
Benninger et al.

[11] Patent Number: 5,822,344
[45] Date of Patent: Oct. 13, 1998

[54] PROCESS AND ARRANGEMENT FOR THE EXCITATION OF A GAS LASER BY MEANS OF A HIGH VOLTAGE DISCHARGE

[75] Inventors: Ralf Benninger, Oberkochen, Germany; Oliver Rompp, Menlo Park, Calif.

[73] Assignee: Carl-Zeiss-Stiftung, Heidenheim, Germany

[21] Appl. No.: 549,608

[22] Filed: Oct. 27, 1995

[30] Foreign Application Priority Data

Oct. 27, 1994 [DE] Germany ................ 44 38 389.4

[51] Int. Cl.⁶ .................................................. H01S 3/00
[52] U.S. Cl. ................................................ 372/38; 372/81
[58] Field of Search ................................ 372/38, 81, 96

[56] References Cited

U.S. PATENT DOCUMENTS

| | | | |
|---|---|---|---|
| 4,430,739 | 2/1984 | McMahan | 372/38 |
| 5,142,203 | 8/1992 | Oda et al. | 315/308 |
| 5,206,870 | 4/1993 | Rorden | 372/25 |
| 5,280,536 | 1/1994 | Dumond et al. | 372/82 |

FOREIGN PATENT DOCUMENTS

| | | |
|---|---|---|
| 0275586 | 7/1988 | European Pat. Off. . |
| 047408 | 3/1992 | European Pat. Off. . |
| 0477621 | 4/1992 | European Pat. Off. . |
| 0537032 | 4/1993 | European Pat. Off. . |
| 2704291 | 9/1977 | Germany . |
| 2900390 | 7/1980 | Germany . |
| 3722363 | 1/1989 | Germany . |
| 3738690 | 5/1989 | Germany . |
| 3910207 | 10/1990 | Germany . |
| 2229873 | 10/1990 | United Kingdom . |
| WO9422182 | 12/1992 | WIPO . |

*Primary Examiner*—Akm E. Ullah
*Assistant Examiner*—Robert E. Wise

[57] ABSTRACT

A gas laser is excited by means of a high voltage discharge, at least one firing pulse being applied to a gas discharge tube. The firing pulse can be initiated by a release signal which is applied to an electronic firing unit. Firing pulses then applied to the gas discharge tube until a check-back signal concerning the successful firing of the gas discharge tube is supplied to the electronic firing unit by a detector unit which monitors the operating state of the gas discharge tube.

15 Claims, 2 Drawing Sheets

PROCESS AND ARRANGEMENT FOR THE EXCITATION OF A GAS LASER BY MEANS OF A HIGH VOLTAGE DISCHARGE

BACKGROUND OF THE INVENTION

1. Field of the Invention

The present invention relates to a process and an arrangement for the excitation of a gas laser by means of a high voltage discharge.

The excitation of the active laser medium in gas lasers usually takes place by means of an electrical discharge. In a series of gas laser types, such as, for example, argon ion lasers, a high voltage discharge is fired in a gas discharge tube. The gaseous laser medium, for example argon ions, is thereby excited by means of various collision processes with the electrons which are liberated in the discharge. The predominant method in argon ions lasers has hitherto usually been to start the discharge by means of a high voltage ignition pulse in the kV region and then to maintain the gas discharge with a distinctly smaller voltage applied to the gas discharge tube. The argon ion laser then provides laser radiation within the respective desired wavelength regions, in continuous wave operation. However, huge cooling requirements result for an argon ion laser operated in such a manner because of the current densities and also the high plasma temperature in the gas discharge tube when output powers in the region of several watts are required. In particular, an expensive cooling circuit is necessary to remove the generated heat appropriately.

2. Discussion of Prior Art

Continuous laser operation is not at present necessary for all applications using gas lasers. Instead, only the occasional operation of such a laser is sometimes desired, as is for example the case in ophthalmology, in the treatment of retinal damage by means of an argon ion laser.

For such applications, the continuously produced output beam of the argon ion laser can be shut off by a corresponding shutter in the beam path, the release of the shutter, or of the laser beam in the direction of the target plane, then taking place by means of a corresponding signal which is released, for example, by means of a foot switch.

A disadvantage of this solution is that the duration of actual use of the laser amounts to only a relatively small fraction of the laser running time, during which the expensive cooling measures mentioned above are constantly necessary. The operation of a gas laser in such a manner is consequently less than optimum from the standpoint of the energy balance.

It is furthermore known to operate the gas laser after the firing of the gas discharge and the desired temporary laser operation in a "stand-by" mode. Here the gas discharge in the tube is constantly maintained by a considerably reduced operating current. However, relatively expensive cooling measures are also necessary in this mode and result in an increased energy consumption and a corresponding generation of noise.

It is therefore proposed in U.S. Pat. No. 5,280,536 to activate the laser operation of such a gas laser only in the desired processing or treatment times or intervals, and in contrast the gas discharge tube is kept, in the inactive times in between, in an operating state that has considerably smaller cooling requirements.

However, the arrangement described has the disadvantage that fluctuations in the operating parameters of the gas discharge tube sometimes have the consequence that the gas discharge in the tube is not started in spite of an applied firing pulse, or else does not take place sufficiently completely. The defined laser operation at the desired moment or in the desired time intervals thus cannot be guaranteed with the required certainty with this arrangement. This is found to be disadvantageous for applications of gas lasers in the medical field.

SUMMARY OF THE INVENTION

The object of the present invention is therefore to eliminate these inadequacies of the state of the art, and to provide a process, or respectively an arrangement, by means of which a reliable excitation of a gas laser by a high voltage discharge is ensured. At the same time, the requirements for the cooling of such a gas laser are to be reduced, and an optimum operation from the standpoint of the energy balance is to be ensured.

The invention also addresses the problem that a laser can not always be started by the very first firing pulse applied, i.e., the operator sometimes has to do several starting procedures to get the laser running. This is time-consuming and poses other problems. To remedy this situation, in the present invention a series (in an automated fashion and with very short time intervals in between) of firing pulses are applied, or at least one firing pulse is applied (in the case when the gas discharge tube has fired after the very first firing pulse), until the electronic firing unit is told (by means of a check-back signal) that a successful firing of the gas discharge tube has occurred.

These objects are achieved by means of an arrangement for excitation of a gas laser by means of a high voltage discharge having a gas discharge tube for generating high voltage discharge, an electronic firing unit that is started by a release signal and applies at least one firing pulse to the gas discharge tube, and a detector unit connected to the gas discharge tube and the electronic firing unit that continuously senses a check-back signal relating to the operating state of the gas discharge tube and transmits the check-back signal to the electronic firing unit at least until the gas discharge tube is successfully fired.

A process for the excitation of a gas laser by means of a high voltage discharge according to the present invention involves starting an electronic firing unit by means of a release signal, providing for application of a series of firing pulses generated by the electronic firing unit to a gas discharge tube having an operating state, applying at least one of the firing pulses, providing a check-back signal from a detection unit (DET) that monitors the operating state of the gas discharge tube to the electronic firing unit, and continuing to apply the firing pulses to the gas discharge tube until a check-back signal representing a successful discharge in the gas discharge tube is supplied to the electronic firing unit.

According to the invention, a check-back signal for an electronic firing unit is generated during the firing process of the high voltage discharge by means of a detector unit connected to the gas discharge tube. The check-back signal then supplies information as to whether a successful firing of the gas discharge in the tube has in fact taken place, that is, information concerning the present operating state of the gas discharge tube. If no successful firing of the gas discharge tube has taken place, a new firing pulse is applied to the gas discharge tube by means of the electronic firing unit, and so on. According to the invention, this takes place until the check-back signal from the detector unit indicates a successful firing of the gas discharge in the tube and thereby a start of oscillation of the laser. The firing pulses that may be required are produced in high frequency succession by the electronic firing unit, so that the user does not in practice notice one or more failures to fire the gas discharge.

The detector unit continuously monitors the present state of the gas discharge tube, in order to generate the check-back signal, and supplies a suitable signal to the electronic firing unit according to the corresponding state. In an advantageous embodiment, the detector unit senses for this purpose the operating voltage present on the gas discharge tube, as a measure of the operating state to be monitored.

It is consequently ensured that on the activation of a release signal for the desired laser operation from a stand-by or inactive operation of the gas discharge tube the required high voltage is correctly started in every case.

The gas discharge tube, or the complete gas laser, can be operated in the said stand-by operation with a relatively inexpensive cooling; that is, the advantageous result is a correspondingly smaller apparatus cost for a gas laser operated in such a manner. This is to be attributed to the fact that in the stand-by operation the gas discharge is not maintained with a reduced operating current, but the gas discharge tube is instead kept in a practically current-free state between the desired activation times.

It is furthermore found to be advantageous to separate the electronic firing unit from the power supply provided for the gas discharge tube, by means of a bypass capacitor which supplies the operating voltage required for the stand-by operation of the tube and for the maintenance of the fired gas discharge. It is ensured by this measure that the power supply is not damaged by the respective high voltage firing pulse.

BRIEF DESCRIPTION OF THE DRAWINGS

Further advantages and also details of the process and the arrangement according to the invention are set forth in the following description of a preferred embodiment, with reference to the accompanying drawings, in which.

DETAILED DESCRIPTION OF PREFERRED EMBODIMENTS

Figure 1:
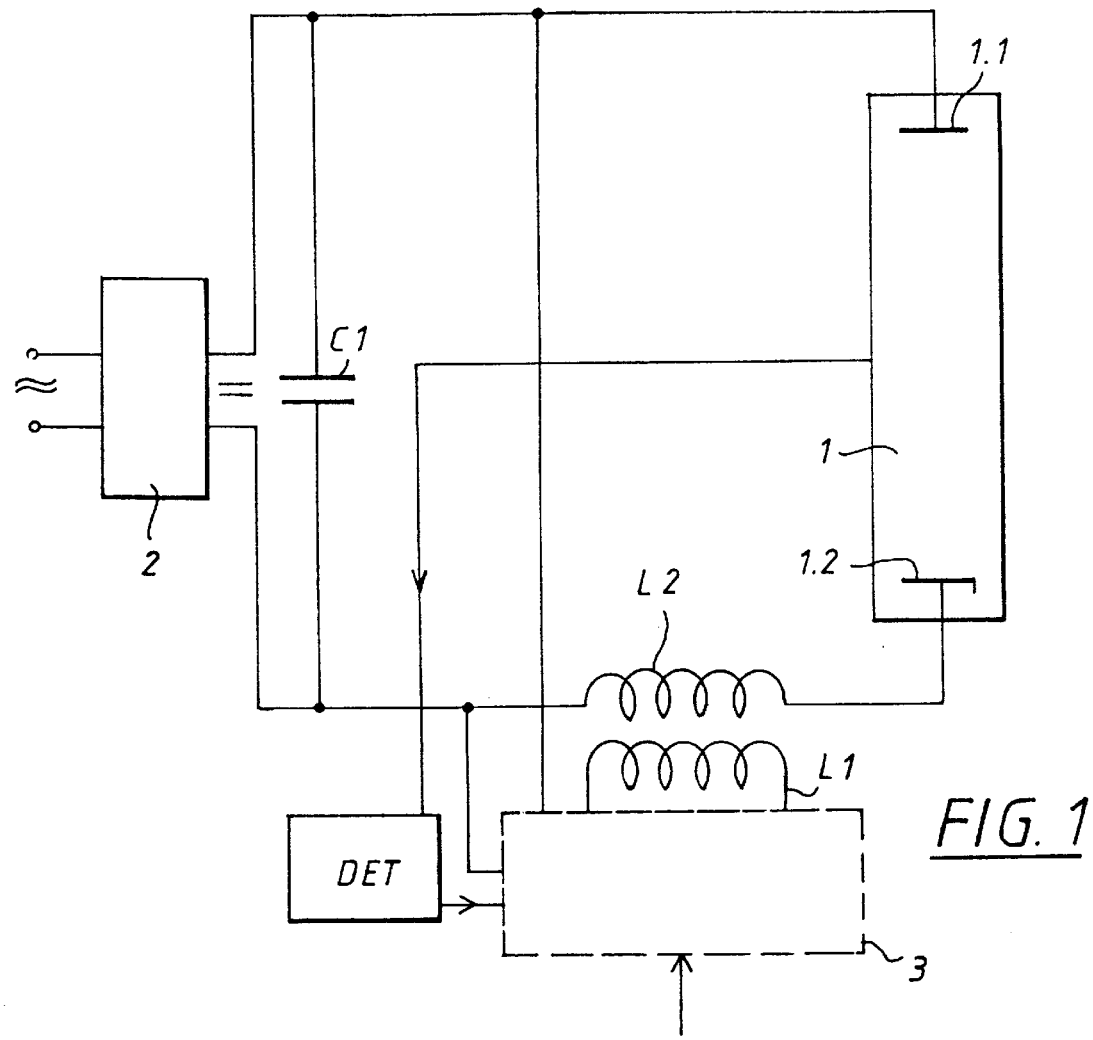
FIG. 1 shows a block circuit diagram for the basic arrangement of the firing electronics and of the gas discharge tube.

A block circuit diagram is given in FIG. 1 of the basic arrangement of the electronic firing unit (3), the detector unit (DET), and the gas discharge tube (1) within the arrangement according to the invention.

The manner of operating an argon ion laser will be described herein below in connection with the arrangement according to the invention. That is, the gas discharge tube (1) is provided with an argon filling under low pressure. This gas laser provides a series of wavelengths, of which the wavelengths 514 nm and 529 nm are particularly suitable for medical fields of application, for example in ophthalmology.

Free electrons and also argon ions are produced between the electrodes (1.1, 1.2) of the gas discharge tube (1) when the high voltage discharge is fired. The liberated electrons acquire kinetic energy by acceleration in the applied electric field of the gas discharge, and transfer this kinetic energy to the argon ions. The argon ions are then excited by these collisions to the higher energy state that is necessary for laser operation.

The gas discharge tube (1) is manufactured in the conventional manner, that is, the tube material consists of a ceramic material, for example, beryllium oxide. Besides this, a magnetic field is arranged to be applied, parallel to the long axis of the gas discharge tube (1), during the high voltage gas discharge that is in progress, in order to concentrate the resulting gas discharge on the axial region. Furthermore, the arrangement according to the invention includes a power supply unit (2) that provides the required operating voltage of the gas discharge tube (1). The power supply unit (2) is supplied by a 230 V alternating current system and transforms the supplied alternating voltage into the required stabilized direct current voltage. The direct current voltage provided by the power supply unit (2), is used as the direct current voltage supply for the gas discharge tube (1). This can also be used for the production of the high voltage firing pulses by means of the electronic firing unit (3), as is explained in FIG. 2 to be described. A known transistor-controlled switching circuit is preferably used as the power supply unit (2), and ensures a stabilized direct current voltage supply of 300 V in no-load operation.

The electronic firing unit (3) is capable, according to the invention, of supplying a high frequency succession of the required firing pulses in order to start the high voltage gas discharge in the gas discharge tube (1). In the embodiment shown, a firing pulse of about 7 kV is produced by the electronic firing unit (3), and has a pulse duration $t_p < 1$ μsec.

The electronic firing unit (3) is activated or triggered for this purpose by means of a release signal that is applied via a suitable switch and a corresponding signal connection to the electronic firing unit (3). A foot switch can be provided for this purpose; the user actuates it when laser operation is required.

The firing pulse that is produced is transmitted by means of a first inductance (L1) coupled to the electronic firing unit (3) to an adjacently arranged further inductance (L2), which in its turn is connected in series with the gas discharge tube (1). The two adjacently arranged inductances (L1, L2) thus represent a known high voltage transformer device that is arranged in series with the gas discharge tube (1). The required firing pulse voltage can then be adjusted in a defined manner by the conventional selection of suitable winding ratios of the two inductances (L1, L2).

A detector unit (DET) is provided within the arrangement according to the invention, and continuously monitors the present operating state of the gas discharge tube (1), at least during the initiated firing process of the gas discharge, and produces corresponding check-back signals that relate to the present status or operating state of the gas discharge tube. The check-back signals are continuously fed to the electronic firing unit (3), which generates further firing pulses, etc., according to whether or not a successful firing of the discharge in the gas discharge tube (1) has already taken place. The multiple firing pulses, if required, can be emitted by the electronic firing unit (3) in high frequency succession, in the kHz range, so that a first unsuccessful attempt or even multiple unsuccessful attempts to fire the required gas discharge is in practice not significantly noticeable by the user.

The detection of the present operating state of the gas discharge tube (1) by the detector unit (DET) can be effected in various ways within the arrangement according to the invention or respectively in the process according to the invention. For example, it is possible, as in the preferred embodiment described herein below in FIG. 2, to continuously monitor the operating voltage or tube voltage present in the gas discharge tube (1), as a measurement quantity. The operating voltage present is an indicator of the respective present operating state of the gas discharge tube (1) or of the gas laser. In the case of a successful firing of the discharge in the gas discharge tube (1) and a starting of the oscillation of the gas laser, the operating voltage falls from the no-load supply voltage provided to a clearly smaller voltage value, which can be utilized by the electronic firing unit (3) as a distinct signal regarding the successful firing of the gas discharge. In the case of a no-load supply voltage of about 300 V, the operating voltage after successful firing amounts to about 180 V. Alternatively, it would be possible to sense the operating state of the gas discharge tube (1) by means of a detector unit (3) in another manner. For this purpose, the current flowing through the gas discharge tube (1) could be determined, or else detection of the emitted laser light could take place. The construction of a preferred detector (DET) and also details of possible alternative configurations are further explained herein below.

A bypass capacitor (C1) is connected in parallel with the gas discharge tube (1). The bypass capacitor (C1) acts like a short circuit for the high voltage firing pulses produced by the electronic firing unit (3) and screens the power supply unit (2) from the high voltage pulses produced, thus providing for a corresponding protection of these components. A so-called MKP capacitor (polypropylene capacitor) is advantageously used as the bypass capacitor and is capable of handling even large voltage changes within a short time. Alternatively, it would also be possible to use a so-called MKT capacitor, which has similar properties.

The manner of operation of the arrangement according to the invention will now be explained with reference to FIG. 2, based on a detailed representation of a specific embodiment of the electronic firing unit (3). Here the components of the arrangement having a like function and already shown in FIG. 1 are given identical reference symbols.

Figure 2:
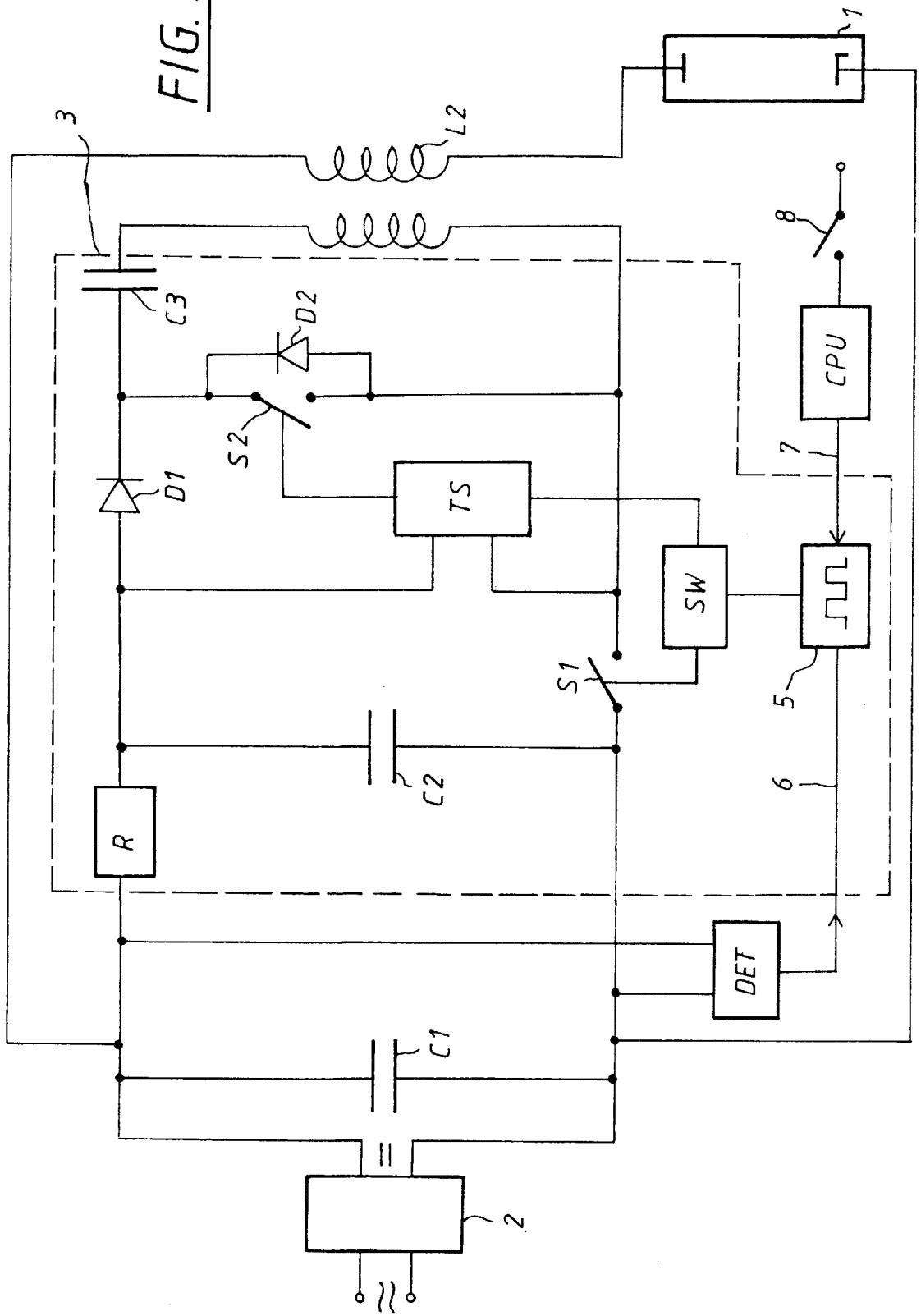
FIG. 2 shows the arrangement of FIG. 1 in greater detail.

The components of the electronic firing unit (3) are shown in FIG. 2 within the dashed line.

The power supply unit (2) provides the required direct current voltage for the arrangement according to the invention. The direct current voltage provided of about 300 V is used in the embodiment shown both to supply the gas discharge tube (1) and also to produce the high voltage firing pulse by means of the electronic firing unit (3). The power supply to the electronic firing unit (3) can of course also be effected by means of a separate voltage supply, as an alternative to the embodiment shown. Likewise, as already mentioned, a bypass capacitor (C1) connected in parallel with the gas discharge tube (1) is provided and screens the power supply unit (2) from the high voltage firing pulses of the electronic firing unit (3). A detector unit (DET) is furthermore provided, and continuously monitors the operating state of the gas discharge tube (1) during the firing process.

The monitoring of the operating state by means of the detector unit (DET) takes place by means of a bridge circuit in the embodiment shown. The operating voltage which is present across the gas discharge tube (1) is sensed by means of a voltage divider, and is compared with a reference voltage. An opto-coupler within the detector unit (DET) is able to quickly sense the bridge voltage with the smallest possible supply current. The specific manner of operation of the detector unit (DET) provided and also possible variants are explained in more detail herein below with reference to FIG. 3. The corresponding check-back of the detection unit (DET) is transmitted by means of a signal connection (6) to an oscillator stage (5) in the electronic firing unit (3). A further signal connection (7) leads to the oscillator stage (5) within the electronic firing unit (3), and by means of it the release signal is fed to the oscillator stage (5) in order to activate the oscillator stage. In the embodiment shown, a trigger signal is provided to a processor unit (CPU) for this purpose. The processor unit (CPU) is furthermore provided with a suitable switch (8) by means of which the user activates the laser operation at a desired moment.

The oscillator stage (5) of the electronic firing unit (3) is furthermore connected to a switching device (SW) which is timed by the oscillator stage (5). The selected timing frequencies of the oscillator stage (5) are about 2.5 kHz in the embodiment shown. However, the required timing frequencies are selected according to the requirements and can be matched to the operating parameters of the tube. If no trigger signal or release signal is applied to the oscillator stage (5), that is, if at this time no laser operation is desired, the switch S1, embodied as a transistor, and the switch S2, embodied as a thyristor, are open or in a non-conductive state. Simultaneously, a capacitor (C3) connected in series with the transformer inductance (L1) of the electronic firing unit (3) is in a discharged state. A second capacitor (C2), which is arranged in parallel with the power supply unit (2) and with the gas discharge tube (1) is at this moment in a charged state, so that the voltage which is present corresponds to the supply voltage of the power supply unit (2) or to the no-load tube voltage at a value of about 300 V. The signal behavior within the electronic firing unit (3) when a release signal or trigger signal is applied by the processor unit (CPU) to the oscillator stage (5) will now be described below, that is, when the switch (8) is actuated by the user in order to release the desired laser operation and activate the oscillator stage (5).

First, the first switch S1 is switched by the switching device (SW) to be conductive. The voltage present on the capacitor C2 passes over via the inductance (L1) of the high voltage transformer device to the other capacitor C3. Voltage is prevented from passing back by a diode (D1) connected between the capacitors (C2, C3). After the completion of the process of passing over, the voltage present on the capacitor (C3) amounts to about 600 V, this measure being required in order to maintain a sufficiently high primary voltage of the high voltage transformer device.

In the next step, the two switches S1 and S2 are again switched to an opened, non-conductive state, by means of the switching device (SW). The voltage present on the capacitor (C3) at this moment furthermore amounts to 600 V, while a voltage of 300 V, which corresponds to the delivered supply voltage of the power supply unit (2), again builds up on the other capacitor (C2).

The switch (S2) is then closed, i.e., made conductive, by the switching device (SW), upon which the capacitor (C3) discharges via the inductance (L1) of the high voltage transformer device. The resulting discharge current is here limited only by the transformer inductance and the conduction and contact resistances, which are usually small, within the arrangement. The discharge current can reach several hundred amperes.

There is effectively concerned here a resonant circuit which resonates via the diode (D2) and the switch (S2).

When the capacitor (C3) discharges, the high voltage firing pulse that is required for firing the gas discharge and that reaches a voltage of about 7 kV in the embodiment shown, is finally produced.

In the next step, the two switches (S1, S2) are again made non-conductive, or opened, by the switching device (SW).

A driver stage (TS), connected to the switching device (SW) and to the two switches (S1, S2), is furthermore provided within the embodiment of the electronic firing unit shown, and solely ensures that at no time the two switches (S1, S2) are simultaneously in the closed state so that a short circuit could be thereby caused.

The signal sequence that is described in principle can now run its course in a high frequency succession, timed by the oscillator stage (5) of the electronic firing unit (3), until the detector unit (DET) registers that a successful firing of the gas discharge has taken place and sends a corresponding check-back signal to the oscillator stage (5) in order to deactivate the oscillator stage (5) and stop the succession of ignition pulses, or else the activation of the release signal can be terminated by the user.

The arrangement according to the invention consequently ensures that in the case of the desired laser operation from a stand-by operation a successful firing of the gas discharge within the gas discharge tube takes place in every case. In stand-by operation, the gas laser can be operated with a significantly smaller cooling power, since in this state the gas discharge tube is practically free from current. The reliable starting of the gas discharge, or the defined start of oscillation of the gas laser, is ensured by the arrangement and the process according to the invention.

With a corresponding design of the cooling circuit and only short operating intervals of the gas laser, considerably smaller cooling requirements of the overall system thereby result.

A preferred embodiment of a suitable detector unit (DET), such as can be used in the embodiments if FIGS. 1 and 2, will be described herein below with reference to FIG. 3.

As already indicated, the operating voltage $U_R$ present on the gas discharge tube is continuously sensed during the firing process of the gas discharge tube by means of the embodiment described herein below of the detector unit (DET), in order to reach conclusions as to the present operating state of the tube, that is, to decide whether or not a successful firing of the gas discharge has taken place. In the case of firing which has not yet taken place, the operating voltage $U_R$ present on the tube is about 300 V in the embodiment shown, while in the case of a successful firing the operating voltage $U_R$ falls to about 180 V.

A bridge circuit with two voltage divider resistors (R1, R2), which divide the voltage that is present on the gas discharge tube in a defined ratio, is used in the detector unit (DET) to sense the operating voltage $U_R$. The division ratio can be adjusted in a known manner by means of the dimensioning of the two voltage divider resistors (R1, R2), and is advantageously chosen such that the operating voltage in no-load operation, that is, when the gas discharge has not yet taken place, is about 5 V greater than the voltage that is present on the zener diode D3. The voltage of about 5 V results from the addition of the individual voltages that are present on the two diodes D4 and D5 and also on the transmitting diode D6 of an opto-coupler (10).

As long as the no-load operating voltage of 300 V is present on the gas discharge tube, current flows from the voltage divider bridge circuit via the zener diode bridge branch and thus through the transmitting diode (D6) of the opto-coupler (10). The current flowing through the opto-coupler (10) or the transmitting diode (D6) is limited by the resistor R1, but must be large enough for the transmitting diode (D6) of the opto-coupler (10) to be sufficiently controlled in level in this operating state of the tube, in order to reliably excite the output transistor (9) of the opto-coupler (10). The output transistor (9) of the opto-coupler then provides the corresponding check-back signal for the oscillator unit (5), via the signal connection (6). Furthermore, the optionally provided light emitting diode (D3) lights in this operating state.

If, as described above, the no-load voltage breaks down after the successful firing of the gas discharge, the voltage drop over the resistor R2 is smaller than the required zener voltage of the zener diode (D3). Current then no longer flows through the opto-coupler (10), or the corresponding transmitting diode (D6) of the opto-coupler (10), that is, the output transistor (9) is no longer excited and correspondingly, a check-back signal corresponding to no-load operation is no longer transmitted to the oscillator stage (5). The light emitting diode (D5) that is provided for monitoring, also no longer lights. The changeover point of the detector unit (DET) can be adjusted in a defined manner, that is, matched to the respective gas discharge tube operating parameter, by means of the dimensioning of the voltage divider and also the corresponding choice of the zener diode breakdown voltage.

Care must be taken in the selection of all the components within the detector unit (DET) that no high supply currents are needed for the operation of the individual components, since otherwise the two resistors R1 and R2 would have to have an excessive energy dissipation.

Figure 3:
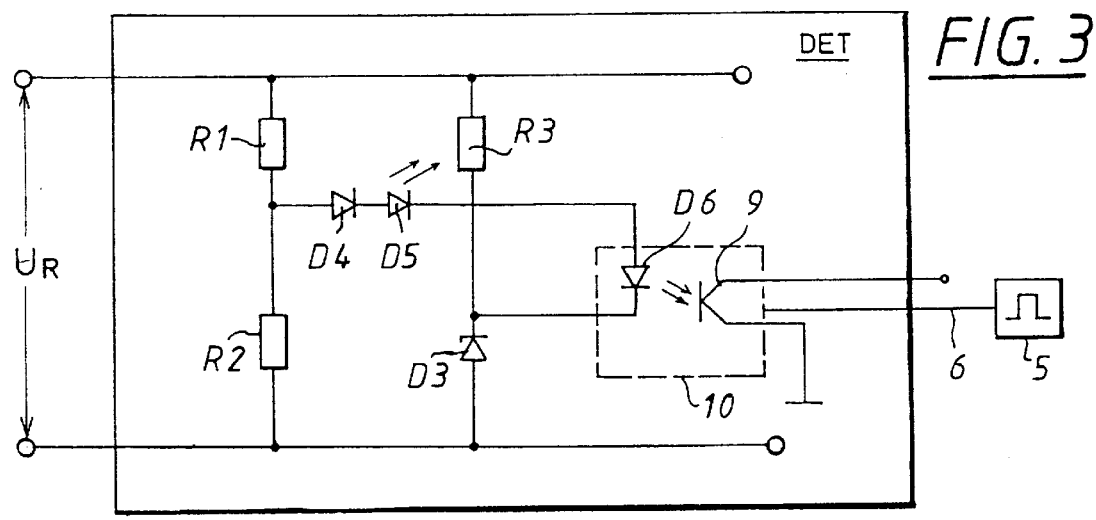
FIG. 3 shows a preferred embodiment of the detector unit of FIGS. 1 and 2.

Alternatively to the embodiment of the detector unit (DET) shown in FIG. 3, the present operating state of the gas discharge tube can also be sensed by means of the tube current. A Hall probe would be suitable for this, by means of which the tube current would be sensed, and would then be compared in a comparator stage with a selectable threshold value and evaluated. An RC member which suppresses transient current changes is advantageously provided here, thereby ensuring a reliable detection of the present operating state.

Alternatively, the detector unit (DET) can also sense the laser light emitted after a successful firing of the gas discharge, so as to generate a check-back signal relating to the present operating state of the gas discharge tube. A suitable photoreceptor is provided for this purpose, the photo voltage resulting from which is amplified, and the amplified voltage is compared in a comparator stage with an adjustable threshold value, a check-back signal thence being generated, relating to the successful firing of the gas discharge.

Thus in addition to the embodiment described, there exists a series of further possibilities of embodiment of the necessary detector unit (DET) within the arrangement according to the invention.

We claim:

1. Process for excitation of a gas laser by means of a high voltage discharge, comprising:
    starting an electronic firing unit by means of a release signal,
    providing for application of a series of firing pulses generated by said electronic firing unit to a gas discharge tube having an operating state,
    applying at least one of said firing pulses,
    providing a check-back signal from a detection unit (DET) that monitors said operating state of said gas discharge tube to said electronic firing unit, and
    continuing to apply said firing pulses to said gas discharge tube until a check-back signal representing a successful discharge in said gas discharge tube is supplied to said electronic firing unit.

2. Process according to claim 1, further comprising continuously sensing by means of said detection unit (DET) operating voltage present in said gas discharge tube as a measurement value for said operating state of said gas discharge tube, and continuously transmitting from said detection unit (DET) to said electronic firing unit check-back signals corresponding to said operating state.

3. Process according to claim 1, further comprising applying firing pulses having a voltage of 7 kV and a repetition frequency of 2.5 kHz to said high voltage discharge.

4. Process according to claim 1, further comprising exciting an argon ion laser by means of said high voltage discharge.

5. Process according to claim 1, further comprising:

activating an oscillator stage within said electronic firing unit by means of said release signal, timing frequency of switching sequence controlled by a switching device (SW) by means of said oscillator stage, and deactivating said oscillator stage in response to said check-back signal concerning a successful discharge.

6. Arrangement for excitation of a gas laser by means of a high voltage discharge comprising:

a gas discharge tube for generating said high voltage discharge, having an operating state, an electronic firing unit that is started by a release signal and applies at least one firing pulse to said gas discharge tube, and a detector unit (DET) connected to said gas discharge tube and said electronic firing unit that continuously senses a check-back signal relating to said operating state of said gas discharge tube and transmits said check-back signal to said electronic firing unit at least until said gas discharge tube is successfully fired.

7. Arrangement according to claim 6, wherein said electronic firing unit includes an adjustable oscillator stage that times a succession of firing pulses from said electronic firing unit.

8. An arrangement according to claim 7, wherein said succession of firing pulses are at high frequency.

9. An arrangement according to claim 7, wherein said electronic firing unit includes a switching device (SW) connected to said adjustable oscillator stage and timed by said adjustable oscillator stage at high frequency.

10. An arrangement according to claim 7, further comprising a processor unit (CPU) and a signal connection for connecting said adjustable oscillator stage to said processor unit (CPU) by means of which said release signal is transmitted from said processor unit (CPU) to said oscillator stage.

11. An arrangement according to claim 7, further comprising a signal connection for connecting said adjustable oscillator stage to said detector unit (DET) by means of which said check-back signal concerning said operating state of said gas discharge tube is continuously transmitted by means of said detector unit (DET) to said adjustable oscillator stage.

12. An arrangement according to claim 6, wherein said electronic firing unit is connected in series with said gas discharge tube.

13. An arrangement according to claim 12, further comprising a first transformer inductance connected to said electronic firing unit and a second transformer inductance arranged adjacent to said first transformer inductance and connected in series with said gas discharge tube.

14. An arrangement according to claim 6, further comprising a power supply unit for supplying power to said gas discharge tube, and a bypass capacitor connected to said power supply unit and in parallel with said gas discharge tube and in series with said electronic firing unit for screening said power supply unit against said firing pulse.

15. An arrangement according to claim 6, wherein said detector unit (DET) includes a bridge circuit with a zener diode bridge branch and an opto-coupler arranged in said zener diode bridge branch for supplying said check-back signal to said electronic firing unit, said bridge circuit being dimensioned such that said opto-coupler generates a check-back signal upon a registered fall of operating voltage (UR) of said gas discharge tube that signals successful firing of said gas discharge tube.

* * * * *